(12) United States Patent
Canniff et al.

(10) Patent No.: US 9,716,841 B2
(45) Date of Patent: Jul. 25, 2017

(54) ADAPTIVE GAIN ADJUSTMENT IN AN IMAGING SYSTEM

(71) Applicant: Analog Devices, Inc., Norwood, MA (US)

(72) Inventors: Daniel Peter Canniff, Boston, MA (US); Ronald Alan Kapusta, Bedford, MA (US)

( * ) Notice: Subject to any disclaimer, the term of this patent is extended or adjusted under 35 U.S.C. 154(b) by 0 days.

(21) Appl. No.: 14/310,872

(22) Filed: Jun. 20, 2014

(65) Prior Publication Data

US 2015/0373277 A1     Dec. 24, 2015

(51) Int. Cl.
*H04N 5/243*     (2006.01)
*H04N 5/235*     (2006.01)
*H04N 5/378*     (2011.01)
*H04N 5/355*     (2011.01)

(52) U.S. Cl.
CPC .......... *H04N 5/243* (2013.01); *H04N 5/2355* (2013.01); *H04N 5/355* (2013.01); *H04N 5/378* (2013.01)

(58) Field of Classification Search
CPC ............................. H04N 5/2352; H04N 5/243
USPC ....................................... 348/229.1
See application file for complete search history.

(56) References Cited

U.S. PATENT DOCUMENTS

| | | | |
|---|---|---|---|
| 3,781,869 A * | 12/1973 | Sudnick | H03F 1/30 341/119 |
| 5,682,035 A * | 10/1997 | Gallagher et al. | 250/332 |
| 6,115,065 A | 9/2000 | Yadid-Pecht et al. | |
| 6,587,143 B1 * | 7/2003 | Boisvert | G11C 27/026 348/241 |
| 6,791,378 B2 * | 9/2004 | Rossi | 327/124 |
| 8,125,551 B2 * | 2/2012 | Nakamura et al. | 348/294 |
| 9,083,889 B2 * | 7/2015 | Yin et al. | |
| 2002/0080406 A1 * | 6/2002 | Kulhalli et al. | 358/3 |
| 2002/0129321 A1 * | 9/2002 | Lin | H03M 1/186 341/139 |
| 2003/0197795 A1 * | 10/2003 | Schinner | 348/255 |
| 2004/0080637 A1 * | 4/2004 | Nakamura et al. | 348/255 |
| 2005/0168602 A1 * | 8/2005 | Sumi et al. | 348/294 |
| 2005/0206760 A1 * | 9/2005 | Higashitsutsumi | 348/294 |

(Continued)

FOREIGN PATENT DOCUMENTS

| | | | | |
|---|---|---|---|---|
| JP | WO 03107659 A1 * | 12/2003 | | H04N 5/21 |
| WO | WO 9960524 A1 * | 11/1999 | | H04N 5/2352 |
| WO | WO-9960524 A1 | 11/1999 | | |

OTHER PUBLICATIONS

Analog Devices; 10-Bit 40 MSPC CCD Signal Processor with Integrated Timing Driver, 28pp. (2003).

(Continued)

*Primary Examiner* — Roberto Velez
*Assistant Examiner* — Cynthia Segura
(74) *Attorney, Agent, or Firm* — Patent Capital Group

(57) ABSTRACT

Systems for processing pixel signals generated by an image sensor to create improved images. More particularly, systems and methods are disclosed that adjust the gain on, inter alia, a pixel-by-pixel basis, to improve the dynamic range of the imaging system. The systems may include level detectors that measure the amplitude of a pixel signal and, based on that measurement, amplify that pixel signal by an amount that allows certain subsequent processing of the pixel signal to be more accurate. More accurately processed pixel signals can provide better overall images.

23 Claims, 10 Drawing Sheets

(56) References Cited

U.S. PATENT DOCUMENTS

| | | | |
|---|---|---|---|
| 2005/0254102 A1* | 11/2005 | Kagami | H04N 1/4078 358/474 |
| 2006/0214085 A1* | 9/2006 | Olsen | H04N 5/378 250/208.1 |
| 2006/0214827 A1* | 9/2006 | Sherry | H03F 1/34 341/120 |
| 2007/0181779 A1* | 8/2007 | Olsen | H04N 5/378 250/208.1 |
| 2008/0129563 A1* | 6/2008 | Boomer | H03M 1/1023 341/120 |
| 2008/0136926 A1* | 6/2008 | Hatanaka et al. | 348/208.99 |
| 2009/0207719 A1* | 8/2009 | Aida | 369/134 |
| 2009/0290053 A1* | 11/2009 | Hammerschmidt | 348/294 |
| 2010/0069026 A1* | 3/2010 | Shute et al. | 455/127.3 |
| 2010/0220212 A1* | 9/2010 | Perlman et al. | 348/229.1 |
| 2010/0245140 A1* | 9/2010 | Iso | H03M 1/1028 341/120 |
| 2013/0147979 A1 | 6/2013 | McMahon et al. | |

OTHER PUBLICATIONS

Analog Dialogue 45(4):1-24 (2011).
Fowler et al., Techniques for Pixel Level Analog to Digital Conversion, SPIE 3360:1-11 (1998), Sep. 14, 1998.
Fowler, High Dynarnic Range Image Sensor Architectures, SPIE 7876, 15 pp. (2011), Jan. 24, 2011.
Kremens et al., System Implications of Implementing Auto-Exposure on Consumer Digital Cameras; SPIE, Version 2,0, 8 pp. (1999), May 22, 1999.
International Search Report and Written Opinion for PCT/US2015/035478 mailed Dec. 17, 2015.

* cited by examiner

ADAPTIVE GAIN ADJUSTMENT IN AN IMAGING SYSTEM

TECHNICAL FIELD

This disclosure relates to systems and methods for electronic imaging, and more particularly to imaging systems that adjust the conversion gain applied to light received by an image sensor.

DESCRIPTION OF RELATED TECHNOLOGY

For an electronic imaging system such as a digital camera, the dynamic range is defined as the ratio between the maximum possible signal and the minimum resolvable signal.

$$D_{range} = \text{Max}_{possible\ signal} / \text{Min}_{resolvable\ signal}$$

Dynamic range is one measure of how well an imaging system can capture images. Dynamic range measures the ability to capture images that vary widely, such as images that have portions that are quite dark and other portions that are quite bright. High dynamic range is desired, as it permits high quality imaging under both low light and bright conditions. As can be seen from the above equation, dynamic range increases inversely to the size of the minimum resolvable signal. The minimum resolvable signal is limited by noise in the system. Consequently, the dynamic range is limited by the noise in the system.

In previous systems, the dynamic range has been improved by using gain. If the lighting condition is low, then high gain is applied to increase the signal level. Applying gain will lift a low-level signal out of the noise floor, which makes it easier to resolve low amplitude signals. Of course, if the lighting condition is bright, then signal levels will be high and there is little need to apply gain.

In current devices, the gain applied to increase signal levels is held constant for an entire image frame. Often, the gain is calculated using an auto-exposure mode. Typically, auto-exposure mode involves taking a low-quality, low-resolution image to judge the lighting conditions, and then based on those conditions, the gain is set for a subsequent high-quality image. Consequently, the entire frame is characterized as low-light or bright-light, and the gain set accordingly.

An alternative technique for improving the dynamic range of an image sensor is described in U.S. Pat. No. 6,115,065, which describes a system to increase the dynamic range of image sensors by having more than one integration time for each pixel in the image sensor. The techniques described are largely applied to active pixel sensors that have a light sensing sensor and an active transistor to amplify and buffer the signal. To improve dynamic range, each pixel is sampled multiple times during a single frame readout, thus resulting in multiple integration times. By changing the integration time, the amount of light captured by a sensor can be varied. By capturing more light over time, a low-light image may be brightened and this may improve the signal to noise ratio, and therefore the dynamic range.

As effective as the above noted techniques are, there remains a need in art to set the gain on a more dynamic basis, so that the intra-scene dynamic range may be maximized.

SUMMARY

The systems and methods described herein include imaging systems having analog front-ends (AFEs). In certain implementations, the systems include an image sensor, which is typically a sensor with light as an input and voltage as an output, although other types of image sensors may be used. The sensor output is connected to the AFE input, which then converts the sensor signal to digital bits. The digital bits are processed by an image signal processor. The AFE consists of at least two functional units, a gain unit and an analog-to-digital converter (ADC). Optionally, the gain unit may be implemented within other functional units, such as a sample-and-hold unit or a correlated double sampling unit.

For certain implementations of the systems and methods described herein the gain is changed within a single frame, typically on a pixel-by-pixel basis. Effectively, the systems and methods described herein, in some implementations, provide pixel level gain control of the pixels in an image signal. In one particular implementation, there are two gain settings, low and high. Before applying gain, the system determines whether the pixel signal generated by the image sensor has a small or large amplitude. If the pixel signal amplitude is large, then the gain block is set low to provide a low level of gain. Alternatively, if the pixel signal amplitude is small, then the gain block is set high, to provide a high level of gain. In one implementation, the gain is set to have the pixel signal fill, or substantially fill, the full-scale of the ADC input range. By using the full-scale of the ADC input range, the systems and methods may reduce or minimize the impact of ADC noise and improve or maximize the dynamic range.

In one implementation, a signal level-detector senses whether the pixel signal is large or small, typically as compared to a set threshold voltage. With a two gain-setting configuration, the detector may be a comparator with the appropriate threshold voltage set as one input to the comparator. More complex gain schemes maybe employed having multiple comparators with different thresholds. Other variations may be made as suits the application being addressed. In either case, the amplitude of the pixel signal may be used to select the gain to apply to the amplitude of that respective pixel signal within the image signal, thus providing pixel-level gain control over the pixels in an image.

More specifically, in some implementations, the systems and methods described herein include an imaging system having an image sensor for detecting an image and generating a plurality of pixel signals representative of pixels comprising the detected image, a level detector for measuring an amplitude of respective pixel signals, and an amplifier for amplifying a respective pixel signal as a function of the amplitude measured for the respective pixel signal.

In some implementations, the pixel signals may be analog signals having amplitudes representative of brightness of a pixel in the detected image and the level detector includes a sensor for measuring voltage amplitude.

In some implementations, the imaging system may also include an analog to digital converter for converting the amplitude of the amplified pixel signal to a digital value. Further optionally, the imaging system may include a gain control circuit, responsive to the measured amplitude, for selecting a pre-established gain to apply to the pixel signal.

In some implementations, the level detector measures a series of pixel signals to sequentially measure an amplitude for each respective pixel signal, and the amplifier amplifies a respective pixel signal as a function of the amplitude of that respective pixel signal. In some implementations, the level detector includes a comparator having an input coupled to a threshold voltage.

In some implementations the level detector measures the amplitude on a pixel by pixel basis and the gain applied by the amplifier is changed in response to the measured voltage amplitude. In some implementations at least one pre-established gain applies a gain that is sufficient to amplify a low amplitude pixel signal to an amplitude value that is about mid-way within the input range of an analog-to-digital converter.

In some implementations, the imaging system includes a digital divider coupled to an output of the analog to digital converter and to the level detector for reducing the digital value by a factor substantially similar to the applied amplification. The digital divider unit may be, in some implementations, included within an image processing unit.

In some implementations the imaging system also includes a calibration processor for adjusting an applied amount of digital division to be substantially similar to the applied amplification.

In another aspect, the systems and methods described herein include methods for capturing an image. The methods may include providing an image sensor for detecting an image and generating a plurality of pixel signals representative of pixels that form the detected image, measuring an amplitude of respective pixel signals, and amplifying a respective pixel signal an amount selected as a function of the amplitude measured for the respective pixel signal.

Typically, but not always, the pixel signals are analog signals having amplitudes representative of brightness of a pixel in the detected image and the method measures a voltage amplitude of a respective analog signal. Further, the method may apply an analog to digital converter to convert the amplitude of the amplified pixel signal to digital values. Additionally and optionally, the method may select a gain as a function of the measured amplitude of a respective pixel signal, to apply a selected gain to the respective pixel signal. In some practices, the method may include measuring the amplitude on a pixel by pixel basis and changing an applied gain in response to the measured voltage amplitude of a respective pixel. In some practices the applied gain may be a pre-established gain that applies gain sufficient to amplify a low amplitude pixel signal to an amplitude value at the higher portion of the input range of an analog-to-digital converter.

The methods may also digitally divide an output of the analog to digital converter and the level detector for reducing the digital value by a factor substantially similar to the applied amplification. Optionally, the method may also calibrate an applied amplification with an applied amount of digital division.

BRIEF DESCRIPTION OF THE DRAWINGS

The foregoing and other objects and advantages of the invention will be appreciated more fully from the following further description thereof, with reference to the accompanying drawings. These depicted embodiments are to be understood as illustrative of the invention and not as limiting in any way.

Like reference numbers and designations in the various drawings indicate like elements.

DETAILED DESCRIPTION

Figure 1:
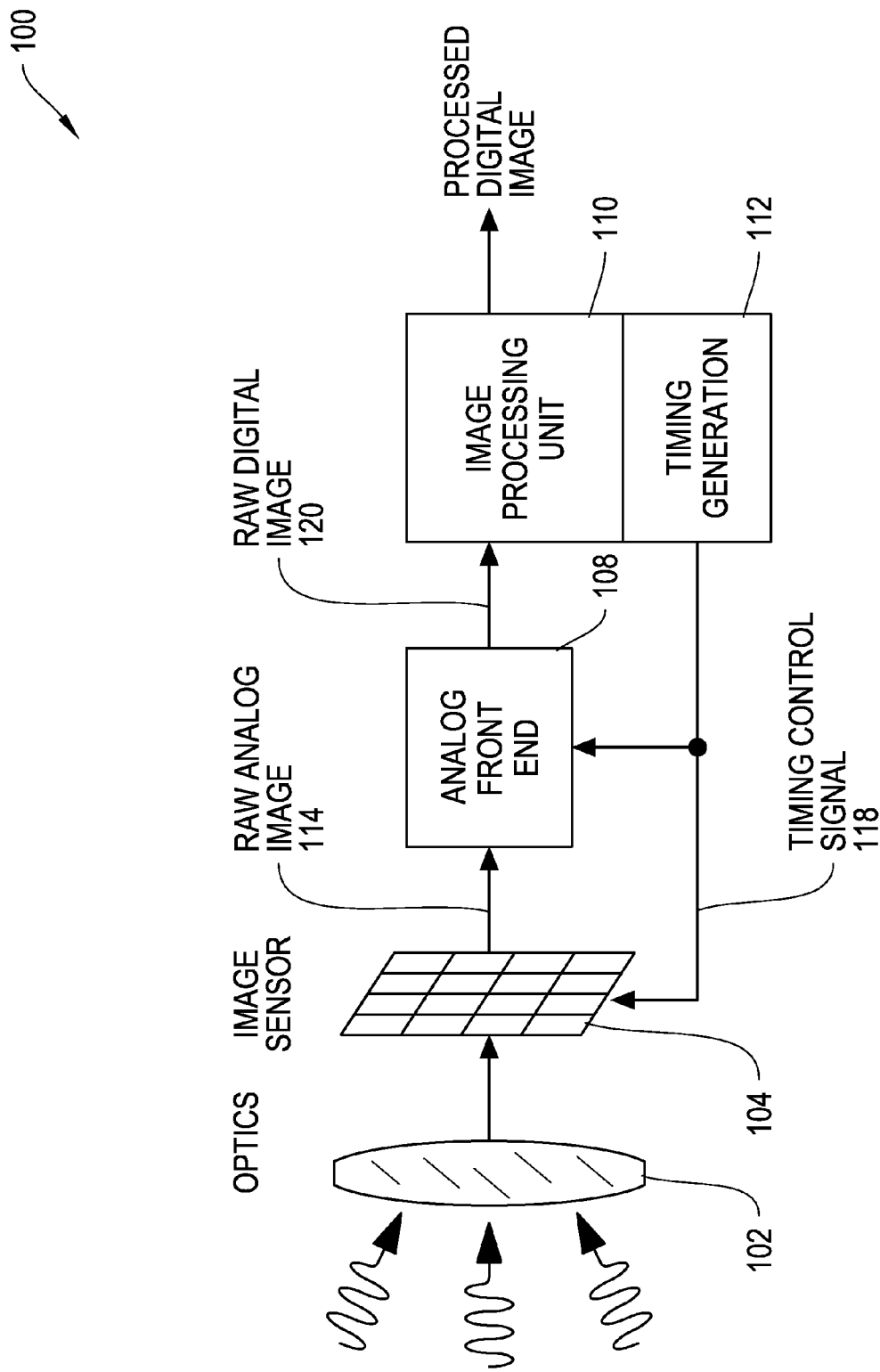
FIG. 1 is a functional block diagram of an imaging system.

The following description is directed to certain implementations for the purposes of describing the innovative aspects of this disclosure. However, a person having ordinary skill in the art will readily recognize that the teachings herein can be applied in a multitude of different ways. Thus, the teachings are not intended to be limited to the implementations described in the text and depicted in the Figures, but instead have wide applicability as will be readily apparent to one having ordinary skill in the art.

The systems and methods described herein provide imaging systems that, in certain embodiments, control the gain applied to signals generated by an image sensor, wherein the gain applied to a pixel signal is a function of the signal amplitude of that pixel signal. The control can process a pixel signal serially and the amplitude of the pixel signal is evaluated and a gain is adjusted for each pixel. In some implementations, the amplitude of the pixel signal represents the amount of light striking a portion of the image sensor. The more light or the more intense the light, that strikes the portion of the image sensor associated with a particular pixel, the larger the amplitude of the associated pixel signal that is generated as an output from the image sensor. Color image sensors can generate pixel signals that include color information, typically also represented as amplitude values of the pixel signal, or color components of the pixel signal, and the systems and methods described herein may be used with color image sensors as well.

In certain particular implementations, the gain may be changed within a frame, and in certain further implementations, gain may be changed on a pixel-by-pixel basis. In alternative implementations, the gain may be applied more generally and for example on a region-by-region basis, where there are multiple regions within a single image capture frame and each region includes more than one pixel.

The systems and methods described herein may provide, among other things, image capture systems, such as cameras and video recorders. In certain implementations, the systems and methods described herein include image capture systems such as image sensors, for example charge coupled device (CCD) sensors, an active pixel sensor, an infra-red light sensor, or any other imaging sensor suitable for capturing an image.

In one implementation, the imaging system has an image sensor that detects an image and generates a plurality of pixel signals. A pixel signal, in some implementations, represents the value of a pixel within the image, and collectively the pixel signals comprise the detected image. The imaging system also includes a level detector that measures the amplitude of, typically, each of the pixel signals. For example, the level detector, in one implementation, is a comparator that measures the amplitude of a pixel signal to determine whether the amplitude is above or below a certain voltage amplitude threshold. The voltage threshold may be set to establish a threshold level of brightness. Pixel signals that are at or below the threshold represent pixels that are in the detected image and have a low intensity, that is, the pixel is not bright and likely is relatively dark. The level detector may detect these low-level pixel signals that have amplitudes below the threshold level.

Typically, the level detector detects voltage levels, but other sensors may generate other representations of the brightness of a pixel. For example, the level detector may detect a current level, a capacitance value, a digital signal representation, or any other representation suitable for indicating the level of the pixel signal. As the choice of representation is changed, the level detector may also be changed to detect signals represented by the chosen characteristic, such as a current detector to detect pixel signals represented by current values.

To resolve the detected image, the imaging system measures the pixel signals. Low-level pixel signals tend to be close to noise levels and as such may be more difficult to resolve. To address this issue, the imaging system includes an amplifier that amplifies the detected low-level pixel signals, to provide greater amplification for those pixel signals at or below the threshold voltage. The amplified pixel signal may be raised above the noise floor and therefore more easily and accurately resolved.

In one implementation, resolving the pixel signals includes passing an analog pixel signal to an analog to digital converter (ADC). The ADC may convert the voltage amplitude of the pixel signal to a digital value representation. The amplifier applies a gain to the pixel signals at or below the voltage threshold. The amplified pixel signal may, in typical implementations, have sufficient gain to place the analog pixel signal in about the middle of the ADC input range. The ADC typically has an input range that has a low range, a mid-range and a high range. The input range represents the range of analog voltages the ADC can resolve. Typically an ADC can resolve most accurately, analog signals that fall within the high-range of the ADC input range. Signals at the higher end of the ADC input range typically are resolved with a larger signal to noise ratio (SNR). In contrast, Signals at the low end of the ADC input range typically are resolved with a low signal to noise ratio. The amplifier typically applies a gain to a low-level pixel signal to amplify the signal above the low end of the ADC input range and typically the gain is selected to produce a signal having an amplitude that above the low range of the ADC and more typically having an amplitude that falls within the midrange of the ADC.

Pixel signals that are above the threshold voltage are typically not amplified and to that end, the amplifier applies a gain of 1 or 0 dB.

The output of the ADC will, in some implementations, consist of a stream of amplified and non-amplified pixel signals. The output of the ADC may be further processed by a digital divider that divides the digital output signal of the ADC by a value selected to remove any gain applied by the amplifier. Removing the applied gain can normalize the output of the ADC so output consists of a stream of non-amplified, or consistently amplified, pixel signals. Typically, the digital divider is coupled to the level detector to determine the gain that was applied to a pixel signal by the amplifier. The digital divider reduces the amplified signals by a factor that is typically equal to the applied gain. Typically, the digitally divided pixel signal has the same, or substantially the same, value as the value of the pixel signal before amplification.

The systems and methods described herein can provide gain control over the pixels in an image on a pixel by pixel basis, or on other bases, such as on a region by region basis, including a line by line or column by column basis. Other modifications and changes may be made, and such modifications will be apparent to those skilled in the art.

FIG. 1 is a functional block diagram of an imaging system. In particular, FIG. 1 shows an imaging system 100 that includes a lens 102, and image sensor 104, and analog front-end (AFE) 108, an image processing unit 110 and a timing circuit 112. As depicted, light reflected from an object (not shown) is focused by the lens 102 onto a surface of the sensor 104. In one implementation, the sensor 104 is a CCD device of the type that has a matrix of light sensing elements. The light focused onto the surface of the sensor 104 will focus a pattern of the image onto this matrix of light sensing elements. Each light sensing element will sense the light focused onto it and will generate an output signal that is representative of the intensity of light hitting the surface of the respective light sensing element.

In one implementation, the sensor 104 is a CCD (change coupled device) sensor formed from a matrix of p-doped metal oxide semiconductor (MOS) capacitors. Each capacitor has a surface that is exposed to the focused light. As photons strike the surface, that capacitance can change and the amount of change can be sensed and measured to represent the brightness of the light striking the surface. FIG. 1 shows the matrix of MOS capacitors by depicting the image sensor 104 as a grid, and each element in the grid represents a separate MOS capacitor. Each MOS capacitor generates one pixel within the captured image, and the signal level of each pixel represents the brightness of that pixel within the captured image.

The charge stored on each MOS capacitor may be read out from the image sensor 104 as the analog signal 114. To this end, the timing circuit 112 is electronically coupled to the image sensor 104 and provides a timing control signal 118 that sequentially drives the MOS capacitors to send their pixel signal charge values to the AFE 108. Other techniques for driving the MOS capacitors to send their pixel signals, such as sending as a data plane of image data, may be also employed in the systems and methods described herein.

The AFE 108 also couples to the timing circuit 112 and receives the timing control signal 118, to allowing the AFE to coordinate the receiving of the sequenced charge values as the image sensor 104 drives these signals out to the AFE 108. The AFE 108 samples the voltage amplitude of each pixel and converts that analog voltage value into a digital value representative of the voltage amplitude. These digital values represent the raw digital image 120 shown in FIG. 1. The raw digital image signal 120 is passed to the image processing unit 110 where, optionally, signal processing operations, such as contrast control or other operations, may be carried out. The image processing unit 110 is optional and in certain implementations, the imaging system operates without such an image processing unit 110.

The timing circuit 112 may be any suitable circuit for generating a control signal that synchronizes the reading of data from the sensor 104 and processing of the raw analog image data 114 by the AFE 108. The timing circuit 112 may be a separate circuit device or may be part of a processor, such as the image processing unit 110.

Figure 2:
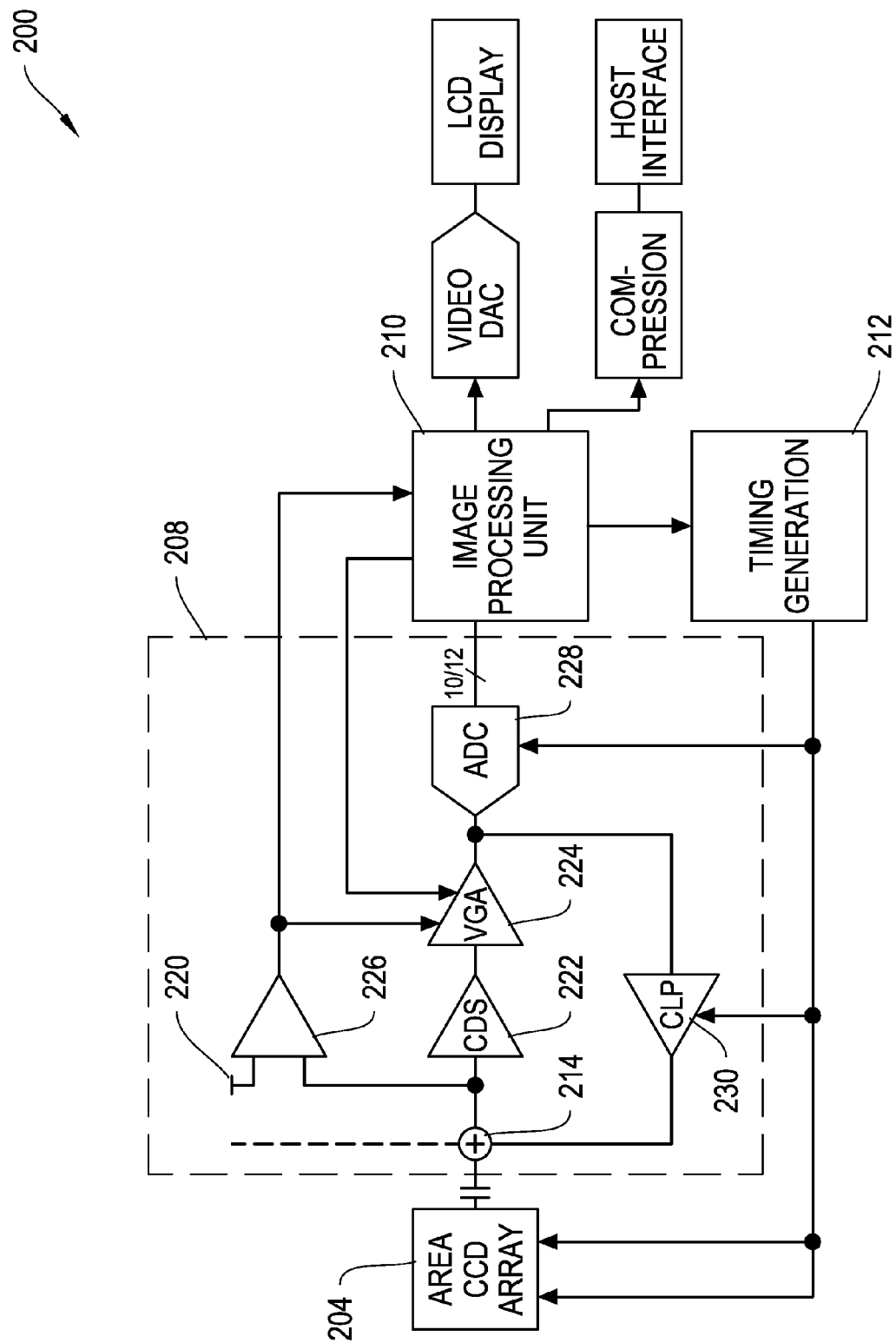
FIG. 2 depicts in more detail the analog front end of an imaging system.

FIG. 2 shows an imaging device 200 that is similar to the imaging device 100 of FIG. 1, and illustrates in more detail the design of one AFE 208 that applies pixel level gain control.

The AFE 208 includes a DC bias 220, a level detector 226, a sample and hold amplifier (SHA) 222, a variable gain amplifier 224, an analog to digital converter (ADC) 228, and a voltage clamp 230. The DC bias 220 acts as a voltage threshold signal that is input to the level detector 226. The image sensor 204 may generate output signals that extend over a voltage range, such as 0V to more than 9V. As such, the image sensor 204 is often AC coupled to the AFE. The voltage clamp 230 may restore the DC level of the signal to a suitable point within the supply range of the AFE 208. The level detector 226 couples to the output of the image sensor 204, via the dc adder 214, which can add any DC bias set by the voltage clamp 230. The SHA 222 couples to the output of the image sensor 204 through the adder 214. The level detector 226 is a comparator that detects whether an input signal from the image sensor 204 has a voltage amplitude that is at or below the amplitude of the voltage threshold 220. The timing circuit 212 couples to the image sensor 204 to drive the image sensor 204 to sequentially output the signal levels of each pixel signal in the captured image. As each pixel signal is input into the level detector 226, the level detector 226 detects the level of the pixel signal by comparing the level of the pixel signal to the level of the voltage threshold 220.

The level detector 226 outputs the result of the comparison and the output connects first to the variable gain amplifier 224 and connects second to the image processing unit 210. The level detector 226 can be a separate circuit device or can be part of another circuit, such as the ADC 228, or some other circuit within the AFE. It can also be part of an ASIC or built as a combination of a circuit and an ASIC, or other similar configurable device.

The SHA 222 can sample and hold the pixel signal and present the held signal to the variable gain amplifier 224. The SHA 222 can be a separate circuit device or can be part of another circuit, such as the ADC 228, or some other circuit within the AFE.

The variable gain amplifier 224 applies a gain to the pixel signal, with the gain applied as a function of the level of the pixel signal. In one implementation, the variable gain amplifier 224 is responsive to the level detector 226. The level detector 226 communicates the output of the comparison between the threshold voltage and the pixel signal. In one implementation, the level detector 226 communicates a digital signal to the variable gain amplifier where a first value indicates that the voltage level of pixel signal was at or below the voltage level of the voltage threshold and a second value indicates that the voltage level of the pixel signal was greater than the voltage level of the threshold voltage.

The variable gain amplifier 224 applies a gain to a pixel signal to amplify, by for example 12 dB, a pixel signal that the level detector 226 detected as having a voltage level that was at or below the voltage level of the voltage threshold set by the dc bias 220.

Figure 3:
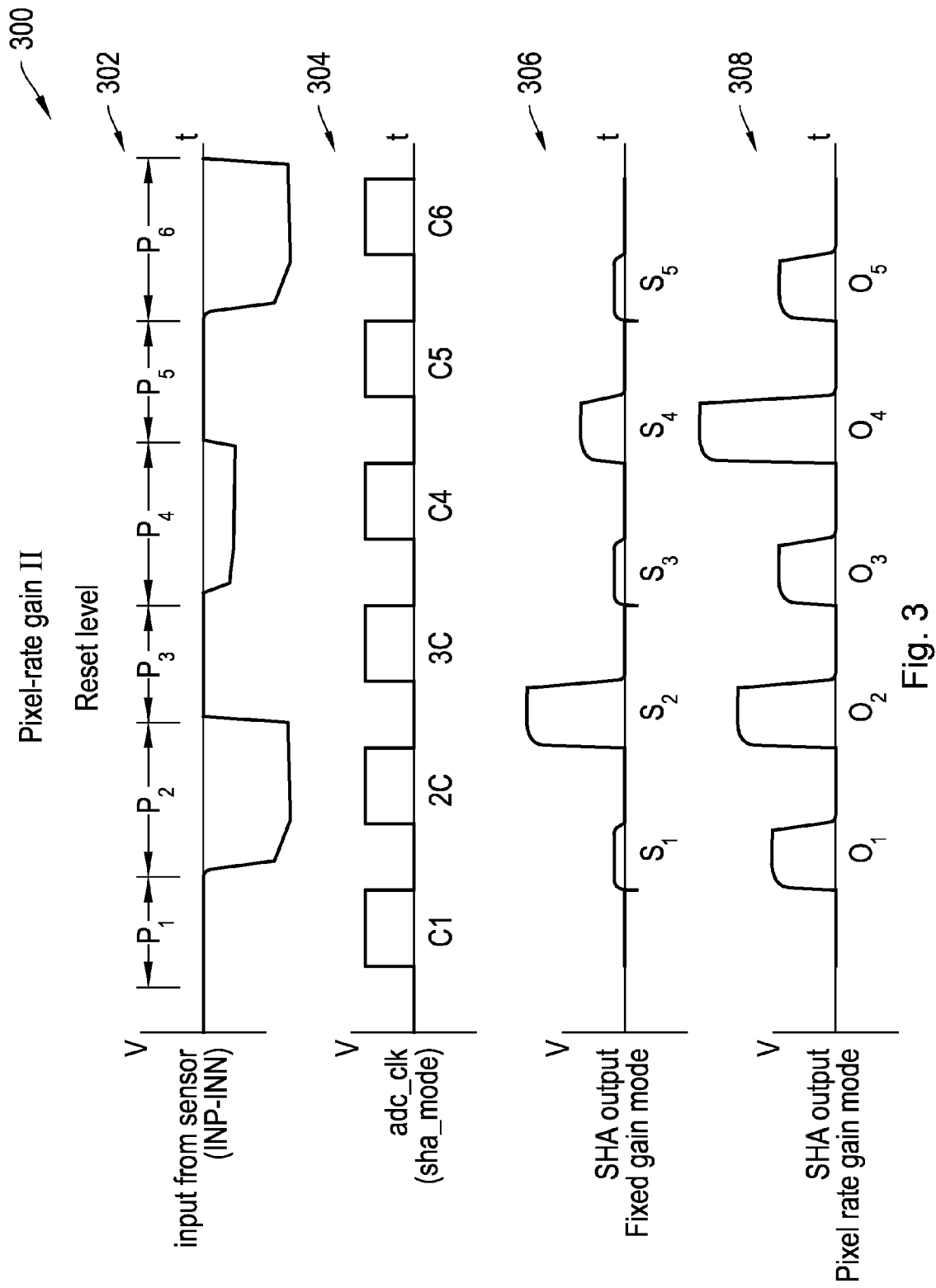
FIG. 3 presents timing signals for sampling a pixel signal and applying gain as a function of signal amplitude.

FIG. 3 depicts timing signals for clocking the raw analog data into the sample and hold of the AFE. The ADC clock signal brings in the data from one MOS capacitor at a time (the data on INP-INN). FIG. 3 shows the pixel rate gain mode operating to produce an analog pixel output signal where the low amplitude pixel values are amplified and the high amplitude pixel values are not. Specifically, FIG. 3 depicts a set of timing diagrams 300. Each timing diagram has a horizontal axis marking time and a vertical axis marking voltage level. Timing diagram 302 illustrates an input signal coming from the image sensor, such as the image sensor 204 depicted in FIG. 2. Timing signal 302 depicts the voltage levels for six pixel signals, $P_1$-$P_6$, each pixel signal may be representative of the voltage level produced from the charged stored on a respective MOS capacitor element within the image sensor. The input sensor holds the pixel signal for one cycle of the analog to digital converter clock. The timing of the ADC clock is illustrated in timing diagram 304, and is depicted as a conventional clock signal.

Timing diagram 306 depicts the sample and hold output of a sampler, such as SHA 222. Timing diagram 306 shows that the input signal 302 is sampled on the rising edges of the ADC clock signal in timing diagram 304. The output is driven by the falling edge of the ADC clock signal. The SHA 222, in this implementation inverts the amplitude of the input signal.

Timing diagram 308 illustrates the output of the variable gain amplifier 224. The timing diagram 308 illustrates that the variable gain amplifier 224 amplifies a low-level pixel signal sample, such as the low-level pixel signal $P_1$ that was sampled by the falling edge of the first clock cycle, $C_1$, in timing diagram 304. As depicted in timing diagram 306, the sampled input signal, $S_1$, is a low-level pixel signal. The timing diagram 308 illustrates that this low-level signal $S_1$ is amplified and generated as output signal $O_1$ by the variable gain amplifier 224. In contrast, the high level pixel signal $P_2$ is sampled at the falling edge of clock cycle $C_2$ and its sampled value $S_2$ is not amplified by the variable gain amplifier 224 and the output signal $O_2$ has substantially the same value as the sampled signal $S_2$. In one implementation, as depicted in FIG. 2, the variable gain amplifier 224 is electrically coupled to the level detector 226. The level detector 226 transmits a level detection signal to the variable gain amplifier 224. The level detection signal indicates whether the voltage amplitude of the pixel signal was measured by the level detector 226 to be at or below a threshold voltage value. The variable gain amplifier responds to the attached level detector signal and applies a gain to amplify the respective pixel signal in response to the level detector signal.

In alternative implementations, the level detector 226 measures the voltage of a pixel signal and the level detection signal indicates the measured voltage amplitude. In this implementation, the voltage amplifier 224 responds to the level detection signal to amplify the respective pixel signal as a function of the voltage amplitude measured for that respective pixel signal. Accordingly, the voltage amplifier can provide multiple gains, with the gain applied being selected as a function of the measured voltage amplitude. As such, the variable gain amplified may provide multiple levels of gain. In still other implementations, the level detector 226 may detect and measure a parameter other than voltage, such as current capacitance, or any other measurable electrical characteristics that can represent the brightness of a pixel.

In the implementation depicted in FIG. 3, the level detection signal is communicated to the image processing unit 210. The image processing unit 210 may adjust the output of the ADC 228 to account for gain applied to a pixel signal by the variable gain amplifier 224.

Figure 4:
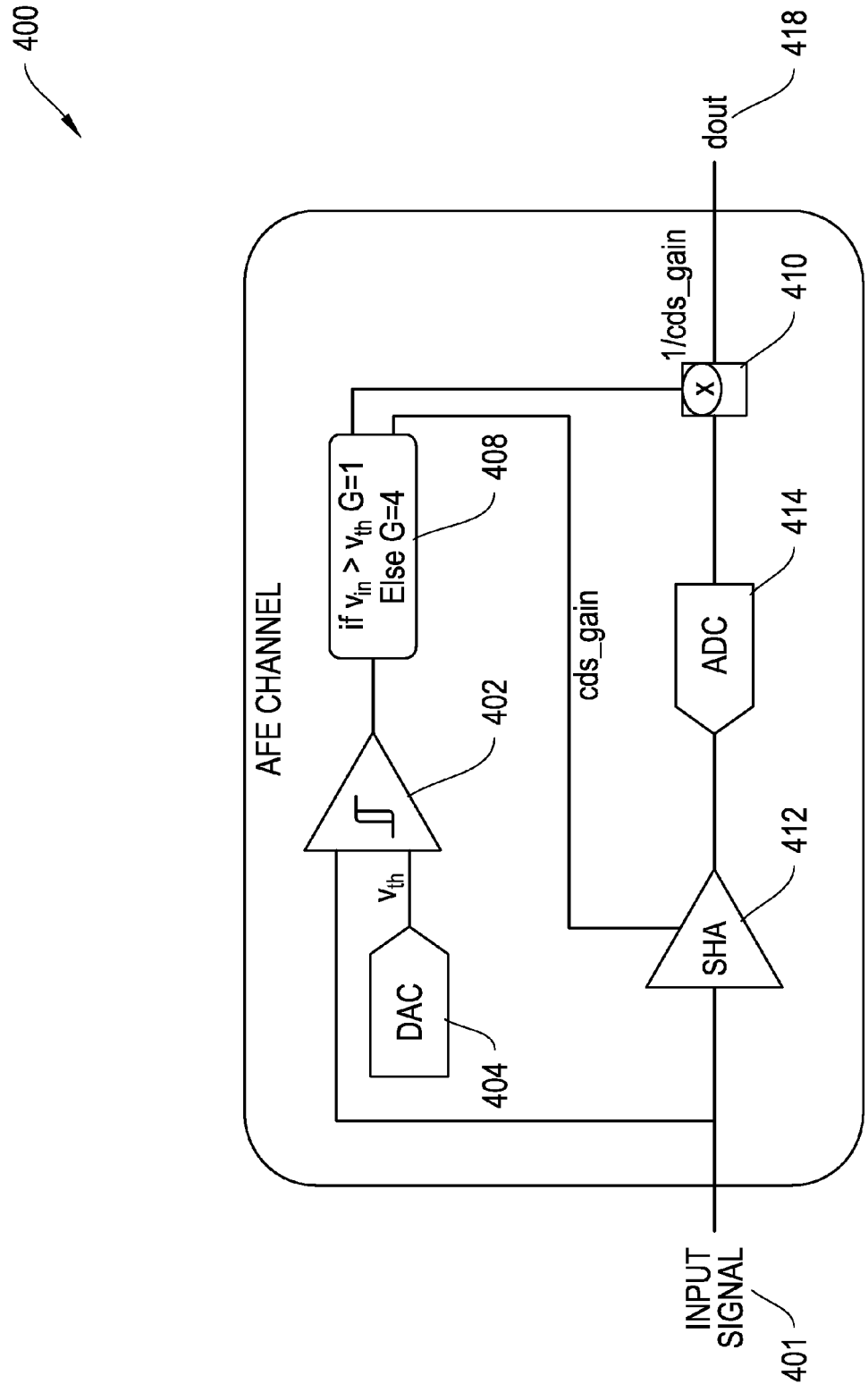
FIG. 4 is a functional block diagram of the analog front end with gain control.

FIG. 4 is a functional block diagram of an AFE that provides variable gain to amplify pixel signals having voltage amplitudes that are too close to the noise floor to provide good dynamic range.

Specifically, FIG. 4 illustrates an AFE 400 that receives the analog pixel signals 401. The analog pixel signals 401 are passed to a comparator 402. The comparator 402 compares the pixel signal 401 to a threshold value, Vth, provided by a digital-to-analog converter (DAC) 404. The DAC may be controlled by a processor (not shown) such as image processor 210, to provide an adjustable threshold voltage, or a programmable threshold voltage that may be calibrated to different lighting or imaging conditions 410.

The DAC 404 delivers the threshold voltage to the level detector 401, which in this implementation is a comparator that generates a binary output signal representative of the comparison of the input signal 401 to the voltage threshold from DAC 404.

The level detector 402 is electrically connected to the input of the gain control circuit 408.

A gain control circuit 408 sets the gain that will be applied by the digital divider 410. As illustrated, if the pixel signal amplitude Vin is greater than the voltage threshold, Vth, then the gain is set to 1. The gain is applied through the sample and hold circuit 412, which acts as a variable gain amplifier. The gain control circuit 408 may, in some implementations be a logic circuit implemented using logic circuit elements or a programmed processor, such as the image processor 210.

The sample and hold circuit 412 passes the amplified analog pixel value to the analog to digital converter (ADC) 414. The ADC 414 converts the analog pixel value to a digital value. The ADC 414 is electrically connected to the digital divider 410 and the output of the ADC 414 is passed to the digital divider.

The digital divider 410 applies an inverse gain to the digital output of the ADC 414. The inverse gain is 1/gain, where gain is the gain amplification, if any, applied by the sample and hold circuit 412. The digital divider 410 therefore removes from the digital output of the ADC 414, the gain applied to the input signal, thereby providing a digital output signal 418 that represents the respective voltage amplitudes of pixel signals delivered from the image sensor, such as image sensor 204.

By amplifying lower amplitude pixel signals, sent as analog input to the ADC 414, the AFE 400 increases the input signal to occupy more of the ADC input signal range. In one optional practice, the AFE 400 also places the input signal more toward the middle of the input-range of the ADC 414. Thus, the input signal may occupy more of the ADC input range and be placed more toward the middle of that input range. This allows the ADC 414 to more accurately process the input signal because the ADC mid-range is less susceptible to noise than the low end of the ADC 414 input range. As such, this improves the ability of the AFE 400 to process low amplitude pixel values and improves the dynamic range of the AFE 400.

Returning to the digital divider 410, the divider 410 may be any suitable divider circuit, including for example, a shift register circuit, an arithmetic logic unit, or any circuit, and any programmable device, suitable for reducing a digital value. In the implementation depicted in FIG. 4, the digital divider 410 is a digital circuit that processes the digital output from the ADC 414. Thus, the digital divider 410 is applying a digital division process to remove the gain applied by the analog variable gain amplifier 412. The difference in operation between analog amplification and digital division may cause a certain level of imprecision between the digitally generated output 418 and the output that would have been generated by an analog division circuit. This imprecision or deviation is depicted by the transfer function of FIG. 5A and the deviation from the theoretical gain depicted in FIG. 5B.

Figures 5A, 5B:
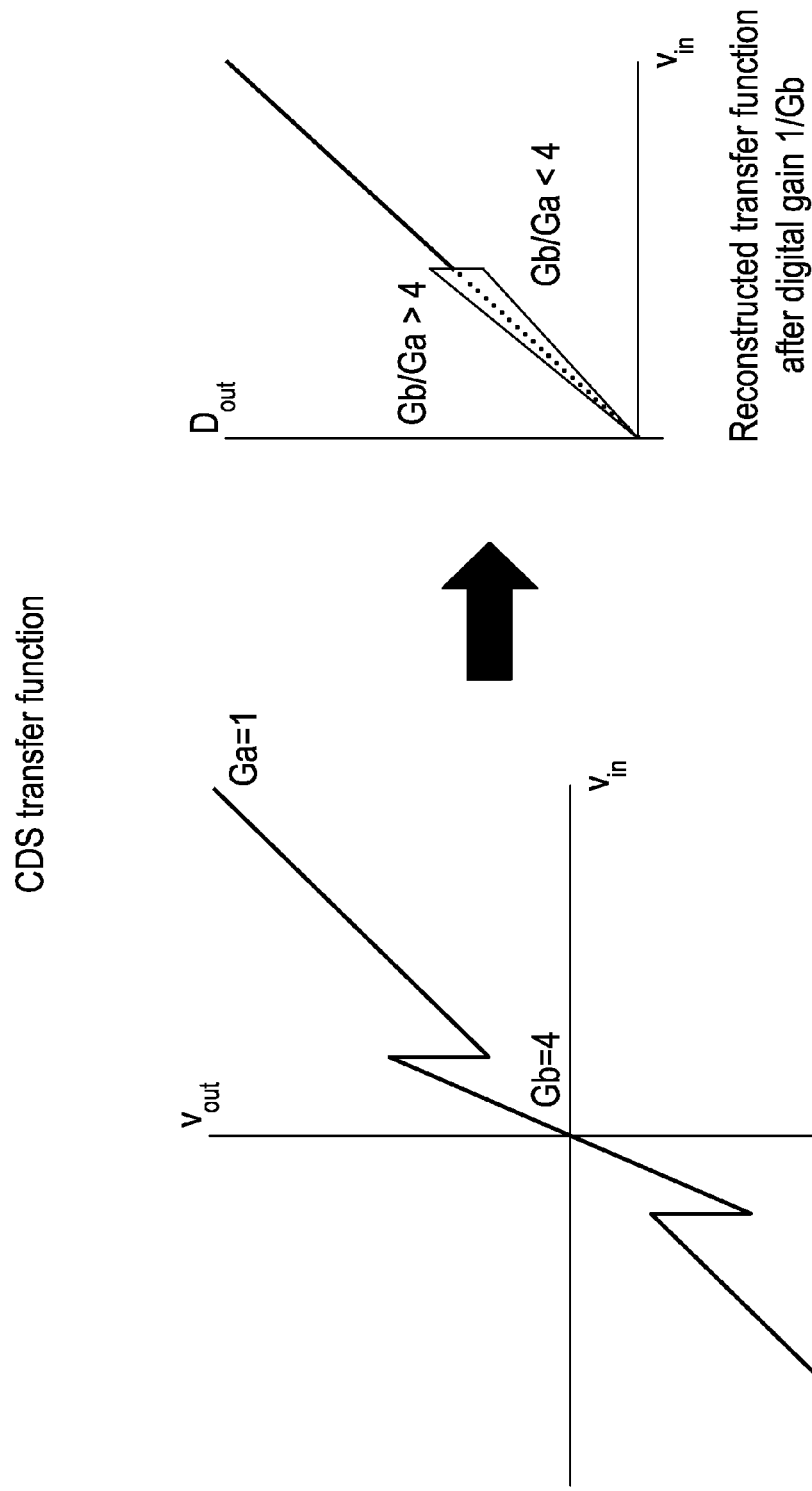
FIGS. 5A and 5B are graphs illustrating the transfer function and reconstructed transfer function of the front end depicted in FIG. 4.

FIG. 5A illustrates one example of the transfer function of the variable gain amplifier, such as the SHA 412 depicted in FIG. 4. FIG. 5A shows a graph with the y-axis showing the output voltage from the SHA 412 and the x-axis showing the input voltage to the SHA 412. As illustrated, the transfer function has two slopes, a first slope for gain of 1 or 0 dB, Ga=1 and a second slope, at low input voltages, of a gain of 4 or 12 dB, Gb=4.

FIG. 5B shows the digital output Dout of the digital divider 410. This graph shows that the slope across all of the input voltages is about 1. However, at lower input voltages, the gain varies from ideal due to, for example, imperfections in the manufacturing process, as the process of amplifying with an analog amplifier circuit and then removing the amplification with a digital process adds non-linearity to the system, which can degrade image quality.

Figure 6:
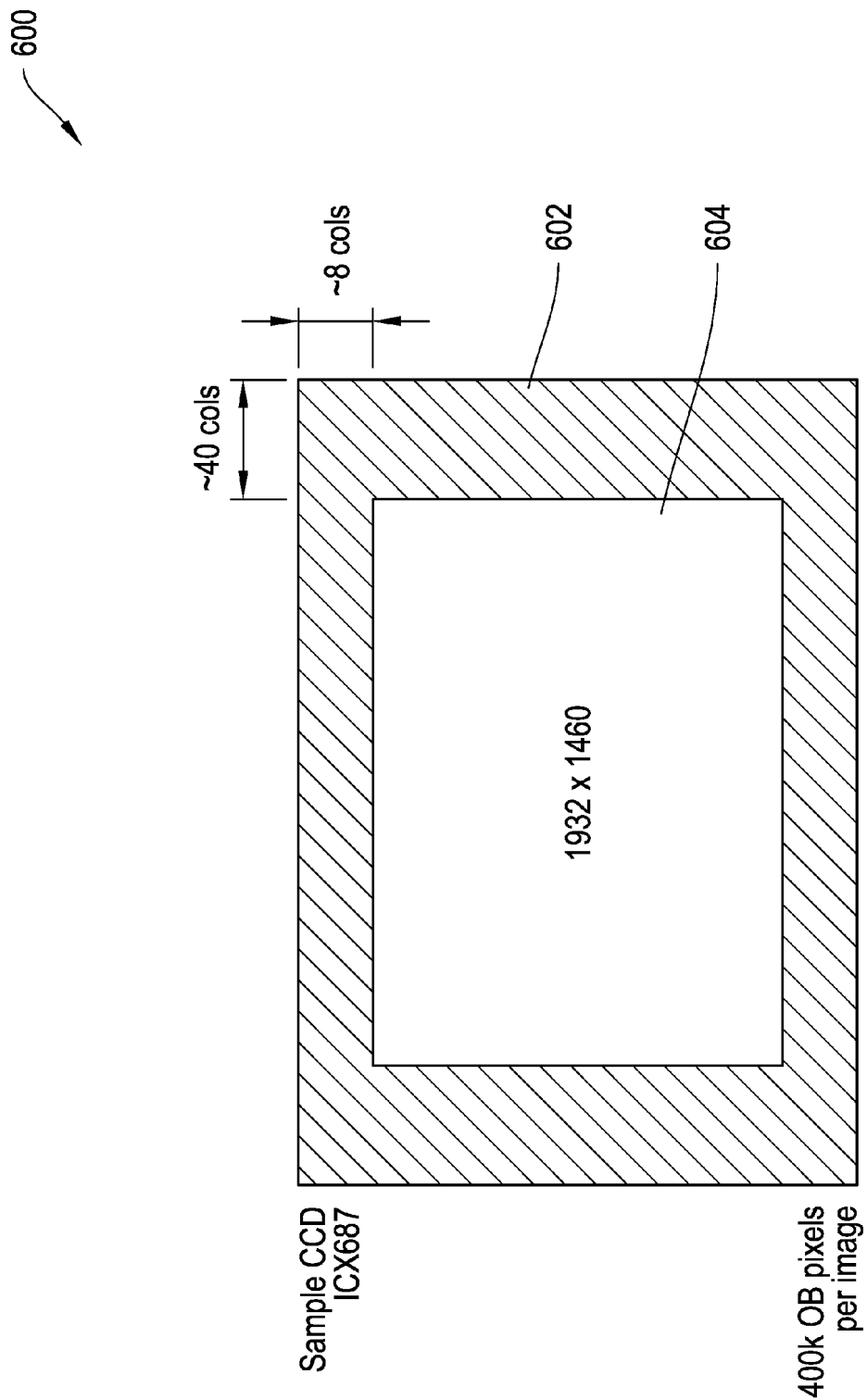
FIG. 6 depicts an image sensor being calibrated.

FIG. 6 depicts as image sensor 600. In this example the image sensor 600 is a ICX687 CCD sensor. The imaging system may optionally implement a calibration process to calibrate for differences between analog amplification and digital division. In one process, illustrated in FIG. 6, the outer region 602 of image sensor 600 is used so that the pixels in region 602 are calibrated at the start of each frame capture operation. Optionally, the calibration process may run continuously on each frame. In one such implementation, the calibration process is run at the start of every frame capture. In this implementation, if an environmental condition changes, such as temperature, or supply voltage, which could impact the system offset and gain occurs, that change can be detected and accounted for in the calibration. The calibration process may capture pixel signals from the pixels in region 602. In one implementation, real sensor data is used to calculate the offset. The calculated value is stored, perhaps in a look-up table, and may be applied for a region of pixels, such as a row, a column, a frame or some other region. Typically, a separate offset is not calculated for each pixel.

Figure 7A:
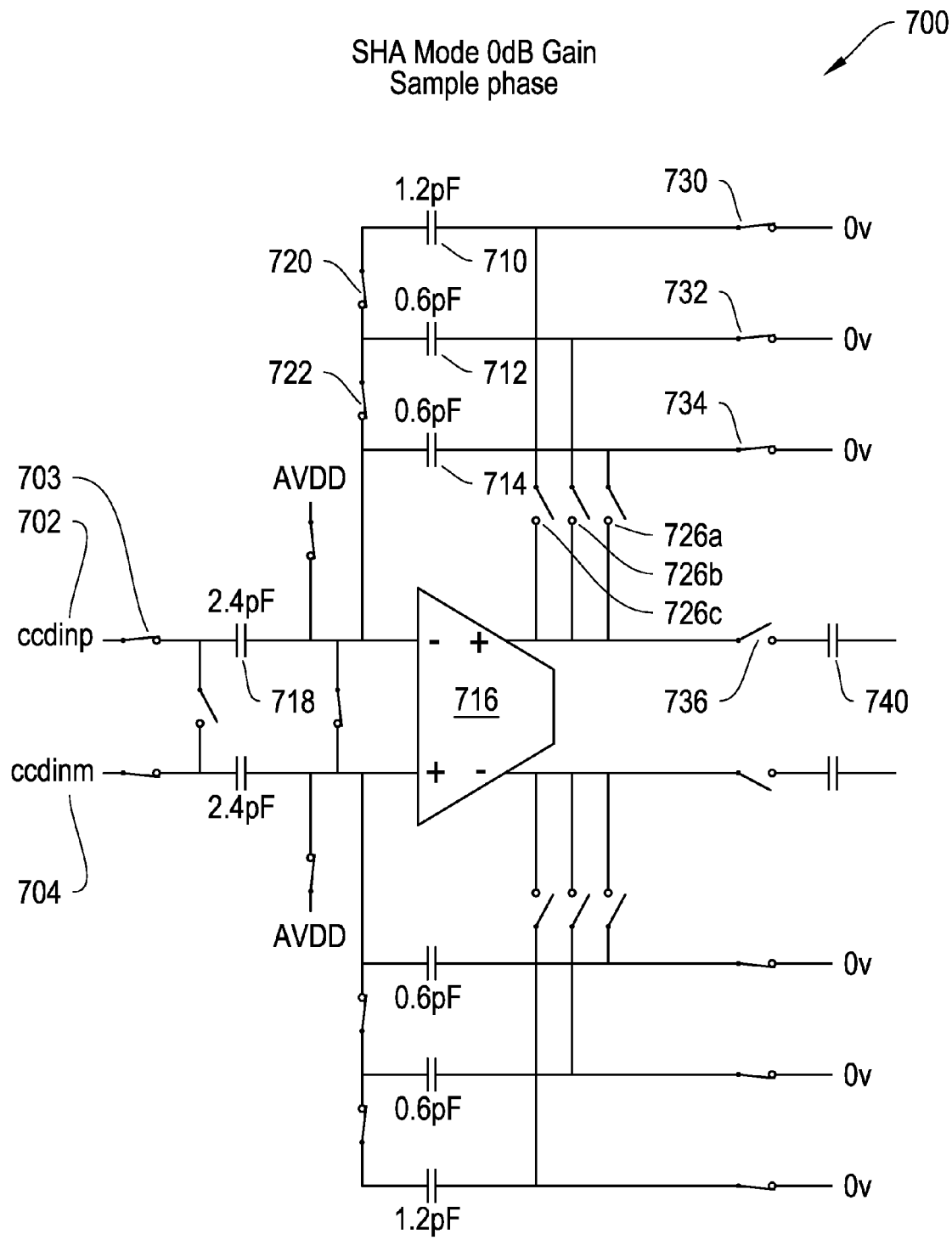
FIGS. 7A-D show one circuit for sampling and holding an image sensor signal.
Figure 7B:
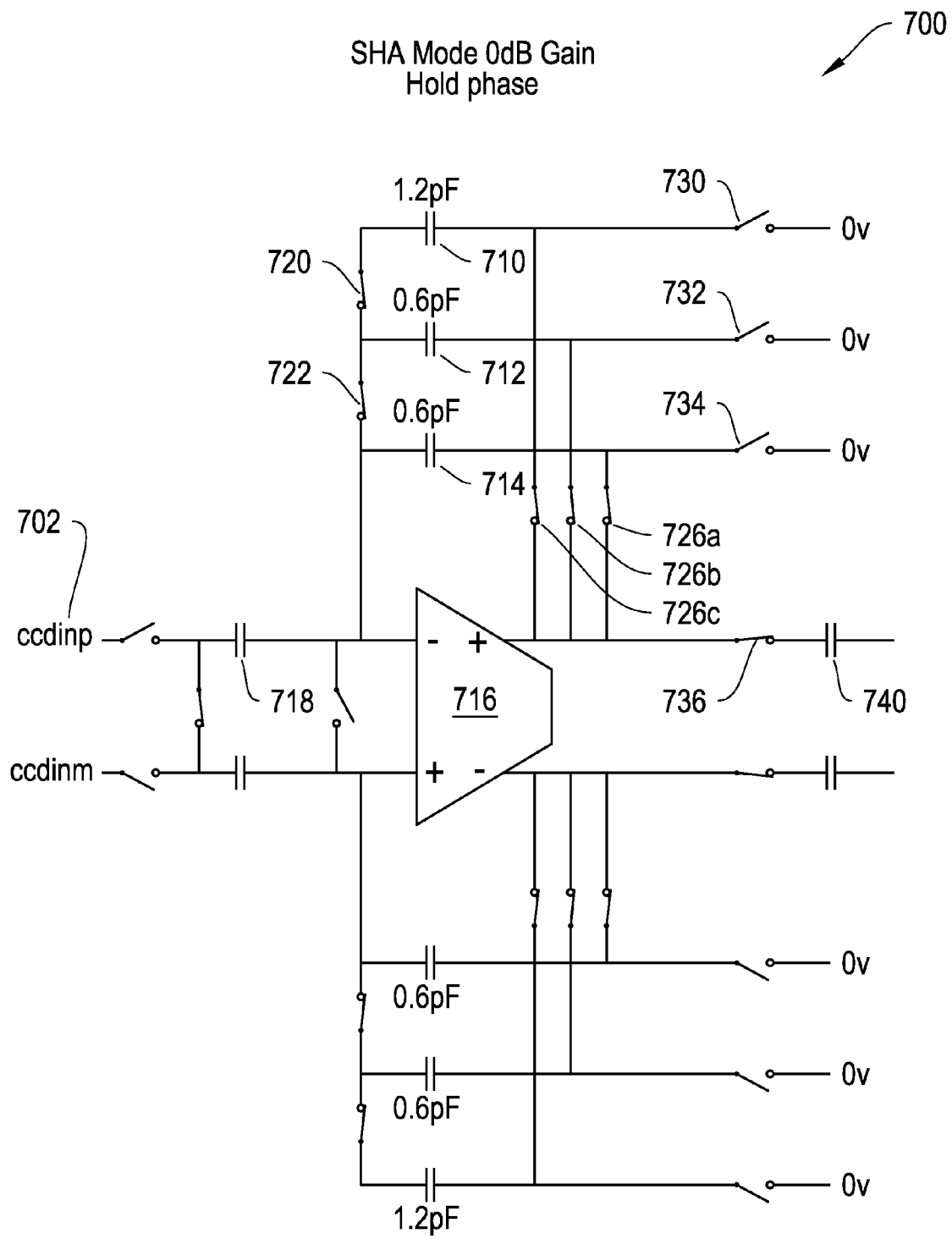

FIGS. 7A and 7B show a sample and hold circuit 700 that can apply 0 dB of gain to a sample of analog input. FIG. 7A illustrates the switches arranged for the sample phase of the amplification process. FIG. 7B illustrates the switches in the hold phase. The switch configurations depicted in FIGS. 7A and 7B provide 0 dB of gain to the analog input.

FIG. 7A illustrates a sample and hold amplifier (SHA) circuit suitable for use as a variable gain amplifier with the AFE depicted in FIG. 4 herein. Specifically, FIG. 7A depicts an SHA circuit 700 that has an input pin 702 for receiving an input signal representative of the charge stored by a capacitor in a CCD image sensor. The SHA 700 includes a differential input that receives input signal 702 and input signal 704. In a typical application, input signal 702 and input signal 704 will be the same, and the amplifier 716 will operate in differential mode. As such, since the circuit is fully differential, it can be understood by reviewing either half of the feedback circuit. For ease of illustration, the half of the feedback circuit coupled to input signal 702 will be described.

Input signal 702 is forced on capacitor 718, which in this example, has a value of 2.4 pF. The storage capacitor 718 connects through switch 706 to voltage supply AVDD. In one example AVVD is set to 1.2.V.

In the sample phase of operation, depicted in FIG. 7A, the feedback switches 726A-C are open, and no feedback through the capacitors 710, 712 and 714 takes place. Applied voltages 740 prevent the feedback capacitors 710, 712 and 714 from floating and therefore reaching and unknown voltage. In this example the applied voltage is 0.0V.

In FIG. 7B, the circuit 700 is placed into the hold phase of operation. In the hold phase, the gain, if any, is applied to the input signal 702. To that end, the input switch 703 is opened to decouple the storage capacitor 718 from the input signal 702. Additionally, the feedback switches 726 A-C are all closed to complete feedback paths through all three feedback capacitors 710, 712 and 714. The closed switches 726 A-C put the circuit 700 in amplifying mode. Charge on the storage capacitor is equal to the capacitance of the storage capacitor multiplied by the voltage:

$$q = \text{Capacitance} \times \text{Voltage}$$

where q is charge.

The charge from the storage capacitor 718 transfers to the feedback capacitors 710, 712 and 714, with all feedback capacitors 710, 712 and 714 being charged as all switches 726 A-C are closed. Charge is conserved and the conserved charge passes to the feedback capacitors 710, 712 and 714 in proportion to the capacitance of each individual storage capacitor. The feedback capacitors 710, 712 and 714 are arranged in parallel and as such their capacitances add together; and the summed capacitance of the three storage capacitors 710, 712 and 714 are equal to the capacitance of the storage capacitor 718, in this example 2.4 pF. As the charge is conserved and the capacitance of the parallel feedback capacitors 710, 712 and 714 is the same as the capacitance of the storage capacitor 718, the output voltage will be the same as the voltage stored on the storage capacitor 718 and the applied gain will be 0 dB or 1.

Figure 7C:
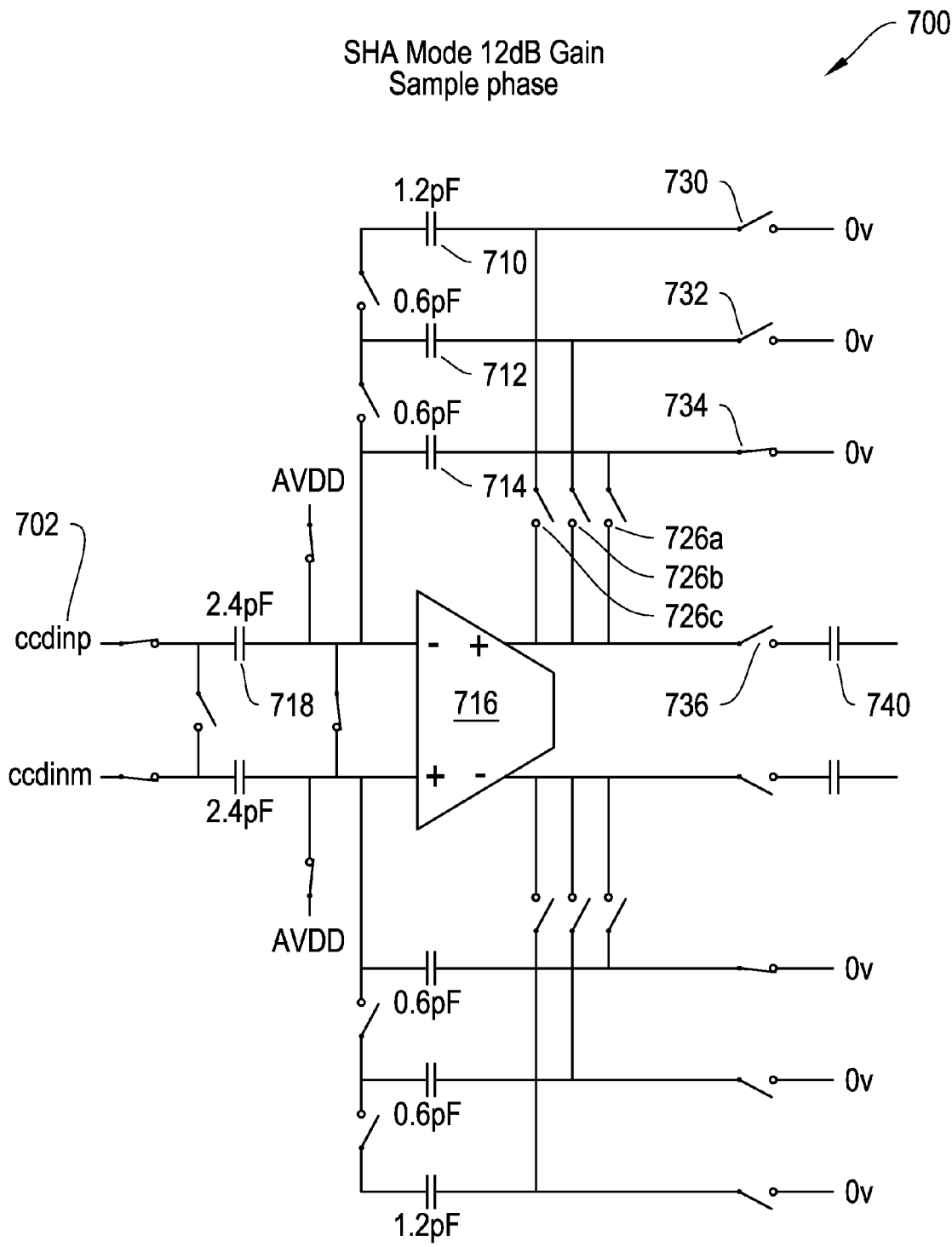
Figure 7D:
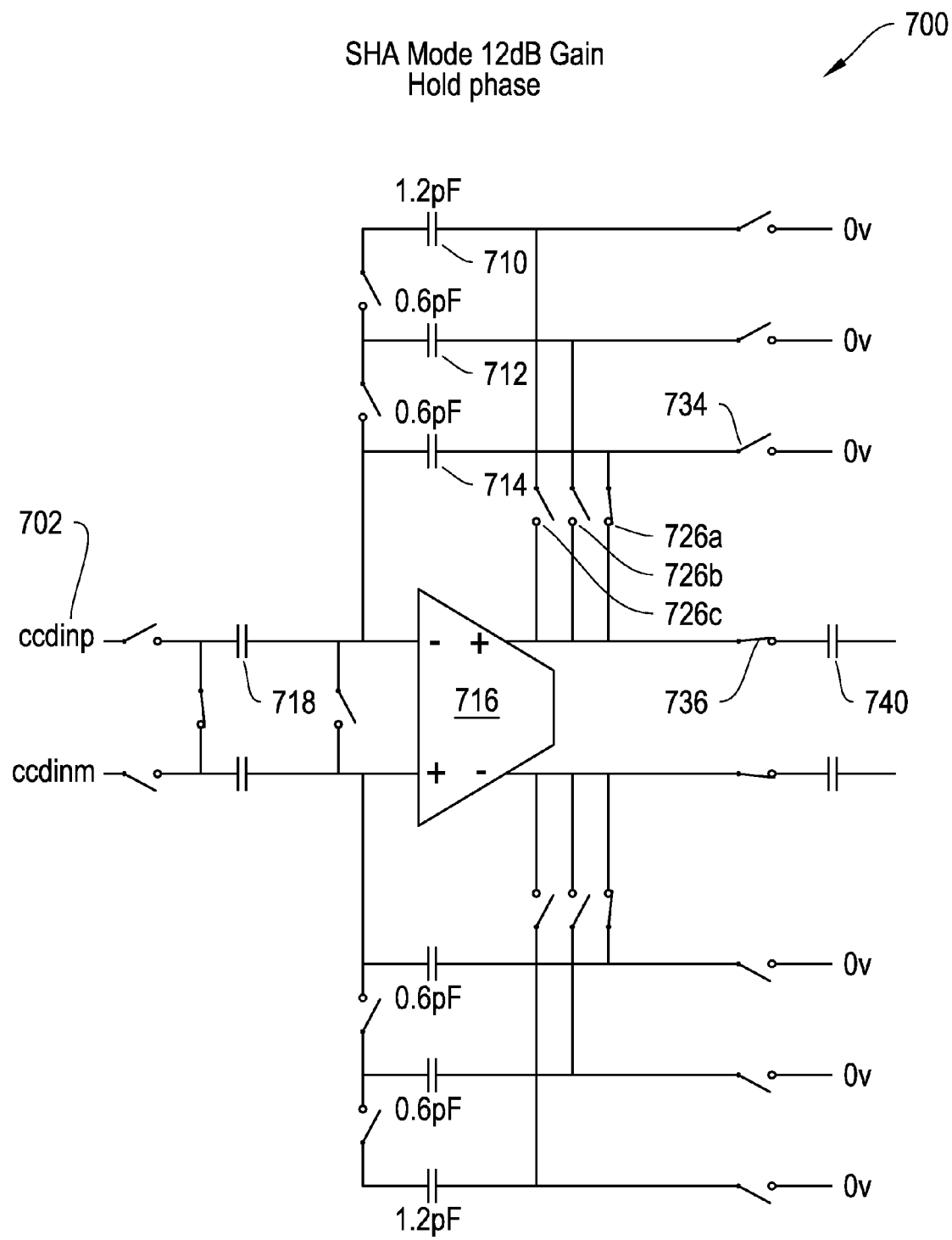

FIGS. 7C and 7D illustrate the SHA 700 with the switches operated in a mode to apply a 12 dB, or approximately a four times, gain, to the input signal 702.

In FIG. 7C the SHA circuit 700 is in sample mode and the input signal 702 is connected to the storage capacitor 718. FIG. 7C represents the operation of the SHA circuit to apply gain to the input signal 702. As depicted, all feedback switches 710, 712 and 714 are open as is output switch 736. In FIG. 7C the two switches to the left of the feedback capacitors 710, 712 and 714 are open. In sample mode these switches are closed and the two switches 730 and 732 are also closed to prevent capacitors 710 and 712 from floating. The input signal 702 charges the storage capacitor 718, and captures a sample from the image sensor, or CDS, such as the SHA 222 depicted in FIG. 2.

After sampling, the circuit 700 may be placed into a hold phase, which amplifies the input signal. In FIG. 7D, the feedback switch 726A is closed and feedback switches 726B and C are open. The input switch 703 is also open, as is switch 734 to decouple the feedback capacitor 714 from the 0.4 volt supply. The output switch 736 is closed to allow output capacitor 740 to charge. In this hold mode, only one feedback path is created, the feedback path through feedback capacitor 714. In this example, the feedback capacitor 714 has a value of 0.6 pF. As charge is conserved as it moves from the 2.4 pF storage capacitor 718 to the 0.6 pF feedback capacitor 714, the voltage must increase by a factor of four, 4, to satisfy the relationship that q=C×V and the fact that q is conserved. Specifically, the voltage must increase by a factor of four to compensate for a four times reduction in capacitance from 2.4 pF to 0.6 pF. The result is a 4 times, or 12 dB, amplification of the sampled voltage from the input signal 702.

The hardware and data processing apparatus used to implement the various illustrative logics, logical blocks, modules and circuits described in connection with the aspects disclosed herein may be implemented or performed using individual circuit elements, such as transistors and capacitors, integrated circuits, such as operational amplifiers, ADCs and logic circuits, and/or a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

The Figures discussed above and the related description of the figures illustrate certain examples of the systems and methods. These illustrations use logical blocks, modules, circuits and algorithm steps described in connection with the implementations disclosed herein. These are ways to describe and disclose implementations of the invention to one of skill in the art and are not meant as an exhaustive list of the possible embodiments. Moreover, one of skill will recognize that these various blocks and circuits may be implemented as electronic hardware, computer software, or combinations of both. The interchangeability of hardware and software is described generally, in terms of functionality, and illustrated in the various illustrative components, blocks, modules, circuits and steps described above. Whether such functionality is implemented in hardware or software depends upon the particular application and design constraints imposed on the overall system. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram or other illustration. However, other operations that are not depicted can be incorporated in the example processes that are described herein. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

As used herein, a phrase referring to "at least one" of a list of items refers to any combination of those items, including single members. As an example, "at least one of: a, b, or c" is intended to cover: a, b, c, a-b, a-c, b-c, and a-b-c.

The described implementations may be carried out in any device, apparatus, or system including those that can be configured to generate an image, whether in motion (such as video) or stationary (such as still images), and whether textual, graphical or pictorial. More particularly, it is contemplated that the described implementations may be included in or associated with a variety of electronic devices such as, but not limited to: digital cameras, mobile telephones, multimedia Internet enabled cellular telephones, mobile television receivers, wireless devices, smartphones, personal data assistants (PDAs), wireless electronic mail receivers, hand-held or portable computers, netbooks, notebooks, smartbooks, tablets, printers, copiers, scanners, facsimile devices, camcorders, game consoles, and camera view displays (such as the display of a rear view camera in a vehicle).

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A system for processing pixel signals to generate an image, comprising
    an image sensor for detecting an image and generating a plurality of pixel signals representative of pixels comprising the detected image,
    a level detector for measuring an amplitude of a respective pixel signal,
    an amplifier for amplifying by an amplification amount the respective pixel signal as a function of the amplitude measured for the respective pixel signal to obtain an amplified signal,
    an analog-to-digital-converter (ADC) to digitize the amplified signal to obtain a digital signal,
    a digital divider for directly receiving an output of the ADC and for reducing an amplitude of the digital signal by a factor substantially similar to the amplification amount, and
    a calibration processor for implementing a calibration process to calibrate for a difference between the amplification amount and the factor.

2. The system according to claim 1, wherein the pixel signals comprise analog signals having amplitudes representative of brightness of a pixel in the detected image and wherein
    the level detector includes a sensor for measuring voltage amplitude.

3. The system of claim 2, wherein the level detector measures the amplitude on a pixel by pixel basis and a gain applied by the amplifier is changed in response to the measured voltage amplitude.

4. The system according to claim 1, further comprising
    a second analog to digital converter for converting the amplitude of the amplified pixel signal to digital values.

5. The system according to claim 4, wherein at least one pre-established gain applies gain sufficient to amplify a low amplitude pixel signal to an amplitude value about mid-way within the input range of the second analog-to-digital converter.

6. The system according to claim 1, further comprising
    a gain control circuit, responsive to the measured amplitude, for selecting a pre-established gain to apply to the pixel signal.

7. The system according to claim 1, wherein
    the level detector measures a series of pixel signals to sequentially measure an amplitude for each respective pixel signal, and wherein the amplifier amplifies a respective pixel signal as a function of the amplitude of that respective pixel signal.

8. The system according to claim 1, wherein the digital divider comprises an image processing unit.

9. The system according to claim 1, wherein the level detector comprises a comparator having an input coupled to a threshold voltage.

10. The system according to claim 1, wherein
    the calibration processor determines an offset based on the difference and applies the offset to at least a portion of the image.

11. The system of claim 1, wherein the factor is substantially equal to the amplification amount.

12. The system of claim 1, wherein the amplification amount and the factor are each greater than one.

13. A method for processing pixel signals to generate an image comprising
    providing an image sensor for detecting an image and generating a plurality of pixel signals representative of pixels that form the detected image,
    measuring an amplitude of a respective pixel signal, amplifying the respective pixel signal by an amplification amount selected as a function of the amplitude measured for the respective pixel signal to obtain an amplified signal, providing an analog-to-digital-converter (ADC) to digitize the amplified signal to obtain a digital signal, providing a digital divider configured to directly receive an output of the ADC and reduce an amplitude of the digital signal by a factor substantially similar to the amplification amount, and calibrating for a difference between the amplification amount and the factor.

14. The method according to claim 13, wherein the pixel signals comprise analog signals having amplitudes representative of brightness of a pixel in the detected image and further comprising measuring a voltage amplitude of a respective analog signal.

15. The method according to claim 13, further comprising converting the amplitude of the amplified pixel signal to digital values.

16. The method according to claim 13, further comprising selecting a gain as a function of the measured amplitude of a respective pixel signal, and applying the gain to the respective pixel signal.

17. The method of claim 13, including measuring the amplitude on a pixel by pixel basis and changing an applied gain in response to a measured voltage amplitude of a respective pixel.

18. The method according to claim 17, wherein at least one pre-established gain applies gain sufficient to amplify a low amplitude pixel signal to an amplitude value at the higher portion of the input range of the analog-to-digital converter.

19. The method according to claim 17, wherein a level detector measures the amplitude of the respective pixel signal, and the digital divider is provided to an output of the analog to digital converter.

20. The method according to claim 13, wherein calibrating comprises:

determining an offset based on the difference, and applying the offset to at least a portion of the image.

21. The method of claim 13, wherein the factor is substantially equal to the amount.

22. The method of claim 13, wherein the amount and the factor are each greater than one.

23. An imaging system for adaptively adjusting gain in pixel signals representative of pixels in a detected image, comprising:

a level detector for measuring an amplitude of a respective pixel signal, an amplifier for amplifying by an amplification amount the respective pixel signal as a function of the amplitude measured for the respective pixel signal to obtain an amplified signal, an analog-to-digital-converter (ADC) to digitize the amplified signal to obtain a digital signal, a digital divider for receiving an output of the ADC and for reducing an amplitude of the digital signal by a factor substantially similar to the amplification amount, and a calibration processor for implementing a calibration process to calibrate for a difference between the amplification amount and the factor.

* * * * *